(12) United States Patent
Nakashima et al.

(10) Patent No.: US 9,791,043 B2
(45) Date of Patent: Oct. 17, 2017

(54) CONTROL DEVICE OF A POWERTRAIN WITH A CENTRIFUGAL PENDULUM DAMPER

(71) Applicant: Mazda Motor Corporation, Aki-gun, Hiroshima (JP)

(72) Inventors: Kyosei Nakashima, Hiroshima (JP); Yasunari Nakayama, Kure (JP); Tadashi Saito, Hiroshima (JP); Masaru Nakagishi, Hiroshima (JP); Narifumi Domen, Aki-gun (JP); Narihito Hongawara, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/368,267

(22) Filed: Dec. 2, 2016

(65) Prior Publication Data
US 2017/0159809 A1 Jun. 8, 2017

(30) Foreign Application Priority Data
Dec. 7, 2015 (JP) .................. 2015-238867

(51) Int. Cl.
*F16H 59/46* (2006.01)
*F16H 61/28* (2006.01)
*F16F 15/14* (2006.01)
*F16H 61/00* (2006.01)

(52) U.S. Cl.
CPC ..... *F16H 61/2807* (2013.01); *F16F 15/1478* (2013.01); *F16H 59/46* (2013.01); *F16H 61/0021* (2013.01); *F16H 2059/465* (2013.01)

(58) Field of Classification Search
CPC .. F16H 61/2807; F16H 59/46; F16H 61/0021; F16H 2059/465; F16F 15/1478
See application file for complete search history.

(56) References Cited

U.S. PATENT DOCUMENTS

| 9,316,299 B2* | 4/2016 | Doegel | .................. F16H 35/00 |
| 2012/0065022 A1* | 3/2012 | Ohashi | ................ B60W 10/023 477/77 |
| 2012/0067685 A1* | 3/2012 | Ohashi | ................ F16H 61/0021 192/3.3 |

(Continued)

FOREIGN PATENT DOCUMENTS

JP 2014228009 A 12/2014

*Primary Examiner* — David J Hlavka
(74) *Attorney, Agent, or Firm* — Alleman Hall Creasman & Tuttle LLP

(57) ABSTRACT

A control device of a powertrain with a centrifugal pendulum damper is provided comprising a power transmission shaft which transmits power between a drive source and an automatic transmission, and a centrifugal pendulum damper which is coupled to the power transmission shaft and a connection/disconnection mechanism. The automatic transmission has a transmission mechanism of a hydraulic pressure control type, which includes a transmission control module which performs a control to supply transmission hydraulic pressure to the transmission mechanism. The transmission control module includes a transmission characteristic changing module which changes a control characteristic of transmission hydraulic pressure according to an engagement degree of the connection/disconnection mechanism.

20 Claims, 7 Drawing Sheets

(56) References Cited

U.S. PATENT DOCUMENTS

| | | | | |
|---|---|---|---|---|
| 2013/0029804 A1* | 1/2013 | Misala | ............... | F16H 3/54 |
| | | | | 477/5 |
| 2014/0216879 A1* | 8/2014 | Gerdeman | ............ | F16H 45/02 |
| | | | | 192/3.28 |
| 2015/0005078 A1* | 1/2015 | Sekiguchi | ............ | F16H 45/02 |
| | | | | 464/24 |
| 2015/0323041 A1* | 11/2015 | Takikawa | ............ | F16F 15/145 |
| | | | | 192/3.29 |
| 2015/0377320 A1* | 12/2015 | Miyahara | ............ | F16F 15/145 |
| | | | | 188/378 |

* cited by examiner

CONTROL DEVICE OF A POWERTRAIN WITH A CENTRIFUGAL PENDULUM DAMPER

BACKGROUND

The present invention relates to a control device of a powertrain of a vehicle or the like, particularly to a control device of a powertrain with a centrifugal pendulum damper.

Conventionally, the use of an engine cylinder cut-off operation and homogenous charge-compression ignition (HCCI) combustion, and furthermore, of an art such as making an automatic transmission torque converter-less by eliminating the torque converter, are known for increasing fuel efficiency of a vehicle equipped with a powertrain comprising a power transmission path which extends from an engine to a drive wheel via an automatic transmission.

However, there is a tendency for output torque fluctuations to become larger in an engine which has adopted a cylinder cut-off operation or HCCI combustion, and also, because engine torque fluctuations are output from an automatic transmission without attenuation when the automatic transmission has been made torque converter-less, torque fluctuations transmitted to a power transmission system on an automatic transmission output side become larger in a vehicle using such an art. In particular, torsional vibrations caused by these larger torque fluctuations may become a cause of vibration or noise generation in various vehicle parts if amplified by resonance of the power transmission system.

For the sake of convenience, the term "automatic transmission" will hereinafter be described as including not only a multi-stage automatic transmission provided with a transmission mechanism for switching between gear ratios in a step-wise manner, but as also including a continuously variable automatic transmission (CVT) provided with a transmission mechanism for continuously changing gear ratios as well. Additionally, a transmission mechanism which is an automatic transmission does not include a torque converter or a torsion damping mechanism.

With respect to the above-described problem, an art is known, such as, for example, operatively coupling a centrifugal pendulum damper to a power transmission shaft as disclosed in JP2014228009A. The centrifugal pendulum damper has a support member which rotates together with a power transmission shaft, and a pendulum which is a mass supported by the support member so as to be able to swing centered on a circumferential point at a fixed radius from an axial center of the support member. When the pendulum swings due to torque fluctuations, a circumferentially-directed component of force is generated in the support member which receives the centrifugal force acting on the pendulum. This component of force acts as an anti-torque which suppresses torque fluctuations of the support member and the power transmission shaft.

In an engine low-speed rotation range, such as at a time of starting, the centrifugal pendulum damper coupled to the power transmission shaft also rotates at a low speed and the centrifugal force acting on the pendulum is reduced, and due to this reduced centrifugal force, a torque fluctuation suppression operation of the pendulum becomes unstable and the pendulum may cause generation of abnormal noise due to contact with a peripheral member. In the invention of JP2014228009A, a connection/disconnection mechanism for attenuating power transmission to the centrifugal pendulum damper is provided between the power transmission shaft and the centrifugal pendulum damper to suppress generation of abnormal noise. As described below, a connection/disconnection mechanism of the present invention is a frictionally-engaged type of clutch which transmits power by frictional force and which can smoothly transmit torque, even when there is a difference in rotational speeds between an input shaft and an output shaft, by shifting from a released state to a slip state or an engaged state while adjusting an engagement degree by controlling hydraulic pressure, electric current, or the like. In the present invention, "engaged" and "released" denote that the connection/disconnection mechanism as a whole is connected and cut-off, respectively, and "slipping" denotes an incomplete connection in which the connection/disconnection mechanism is slipping.

However, when the connection/disconnection mechanism is disposed between the power transmission shaft and the centrifugal pendulum damper as in the prior art described in JP2014228009A, an engagement degree of the connection/disconnection mechanism increases to a slip state or a fully engaged state during a gear shift control, a moment of inertia (an inertia) of the centrifugal pendulum damper is added to the power transmission shaft as a load inertia moment, and because the moment of inertia of the power transmission shaft is thus increased, the gear shift control cannot fully accommodate for this change, and there is a possibility that a gear shift duration will be lengthened. There is also a possibility of a transmission shock being generated if a moment of inertia of the power transmission shaft is increased rapidly. Note that a transmission shock is also possible in a case where the moment of inertia of the power transmission shaft is rapidly decreased when the connection/disconnection mechanism changes from the engaged state to the released state during a gear shift control.

Note that the above-described problem is not limited to a case where an engagement degree of the connection/disconnection mechanism changes during a gear shift control of the transmission mechanism but is also a problem in a case where an engagement degree changes prior to a gear shift control and the changed engagement degree starts an execution of a gear shift control.

The present invention was made in view of the above-described problems related to a control device of a powertrain with a centrifugal pendulum damper and aims to prevent a degradation of transmission performance due to a change in an engagement degree of a connection/disconnection mechanism.

In order to solve the aforementioned problem, a control device of a powertrain with a centrifugal pendulum damper according to the present invention has characteristics of being configured as follows.

According to one aspect of the present invention, a control device for a powertrain comprises a transmission control module. The powertrain comprises a power transmission shaft and a centrifugal pendulum damper. The power transmission shaft is configured to transmit power between a drive source and an automatic transmission, and the centrifugal pendulum damper is configured to be operatively coupled to the power transmission shaft and a connection/disconnection mechanism. The automatic transmission is configured with a transmission mechanism of a hydraulic pressure control type, and the transmission control module, which is operatively coupled to the transmission mechanism, is configured to perform a control to supply transmission hydraulic pressure to the transmission mechanism. The transmission control module executes a transmission characteristic changing module which is a software or firmware program that changes a control characteristic of transmission hydraulic pressure according to an engagement degree of the connection/disconnection mechanism.

According the above configuration, when the engagement degree of the connection/disconnection mechanism changes, a moment of inertia of the power transmission shaft changes according to the engagement degree, because the transmission characteristics changing processor changes the control characteristic of the transmission hydraulic pressure supplied to the transmission mechanism according to the engagement degree, a lengthening of the gear shift duration due to an increased moment of inertia and the generation of transmission shock accompanying a rapid increase or decrease in the moment of inertia can be restrained, and a reduction in transmission performance due to a change of the engagement degree of the connection/disconnection mechanism can be prevented.

Further, the transmission characteristic changing module may increase the transmission hydraulic pressure with an increase in the engagement degree of the connection/disconnection mechanism.

With the above configuration, the higher an engagement degree of the connection/disconnection mechanism is, the transmission characteristic changing module increases the transmission hydraulic pressure and therefore, for example, by increasing the transmission hydraulic pressure of engaged elements of the transmission mechanism at a time of upshifting the transmission mechanism, a lengthening of the gear shift duration can be suppressed.

Further, the transmission characteristic changing module may change the control characteristic of the transmission hydraulic pressure according to a moment of inertia of the power transmission shaft, the moment of inertia being based on the engagement degree of the connection/disconnection mechanism.

With the above configuration, the transmission characteristic changing module changes the transmission hydraulic pressure according to a moment of inertia of the power transmission shaft which changes according to the engagement degree of the connection/disconnection mechanism. Therefore, even when the engagement is changed during a gear shift control, the gear change control may be performed with a higher degree of accuracy by changing the transmission hydraulic pressure according to changes in the moment of inertia which directly influence transmission performance. Therefore, lengthening of the gear shift duration and deterioration of transmission performance due to a change in the engagement degree of the clutch mechanism can be prevented.

Further, when the engagement degree is changed during a gear shift control, the transmission characteristic changing module may change the control characteristic of the transmission hydraulic pressure according to the engagement degree after the gear shift control.

With the configuration as above, the transmission characteristic changing module changes the transmission hydraulic pressure according to an engagement degree of the connection/disconnection mechanism when the engagement degree is changed during a gear shift control during a gear shift control. Therefore, even when a gear shift control and a control requiring a change of the engagement degree of the connection/disconnection mechanism (for example, a cylinder cut-off operation) overlap, both controls may be executed properly.

Further, the transmission characteristic changing module may change the transmission hydraulic pressure in a step-up process during the gear shift control according to the engagement degree of the connection/disconnection mechanism.

With the configuration as above, the transmission characteristic changing module changes the transmission hydraulic pressure in a step-up process during a gear shift control according to the engagement degree of the connection/disconnection mechanism. Therefore, the transmission hydraulic pressure is changed from the torque phase before the inertia phase is started, and, from the beginning of the start of the inertia phase, which is directly influenced by the engagement degree, the transmission hydraulic pressure is changed to a hydraulic pressure which corresponds to the engagement degree. Therefore, since a delay does not occur in the changing of the transmission hydraulic pressure, lengthening of the gear shift duration and generation of transmission shock can be more surely prevented.

Further, the transmission characteristic changing module may determine the engagement degree of the connection/disconnection mechanism based on one of a rotational differential of the connection/disconnection mechanism and a control hydraulic pressure of the connection/disconnection mechanism.

According to the above configuration, the transmission characteristic changing module determines an engagement degree of the connection/disconnection mechanism based on a rotational differential of the connection/disconnection mechanism or a control hydraulic pressure for the connection/disconnection mechanism. Therefore, with a simple configuration equipped with only a rotational speed sensor or hydraulic pressure sensor for simply detecting a rotational differential of the connection/disconnection mechanism or for detecting a control hydraulic pressure, the advantageous effects of the above-described aspects of the invention may be realized.

DETAILED DESCRIPTION OF THE EMBODIMENT

An embodiment of the present invention is described below.

Figure 1:
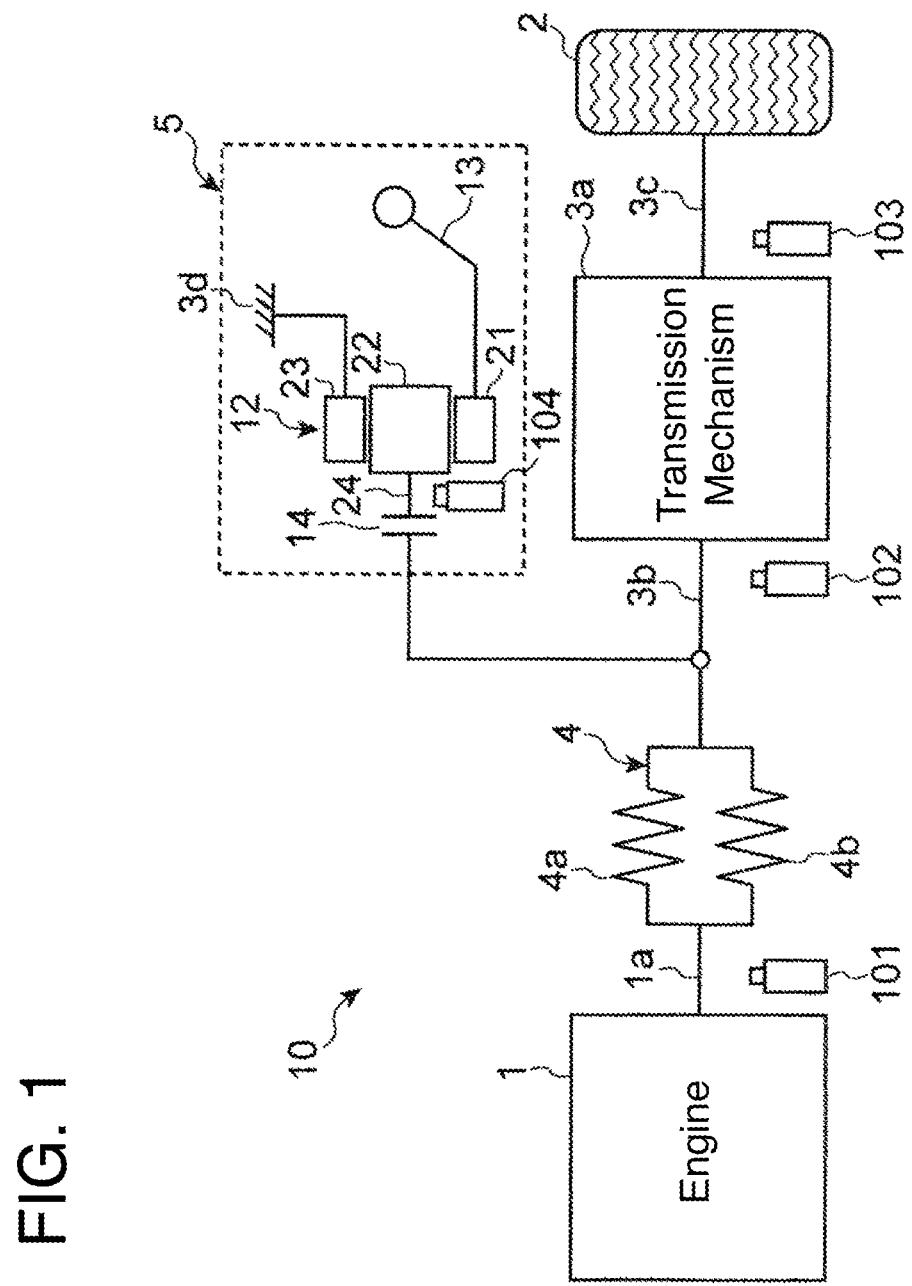
FIG. 1 is a skeleton diagram illustrating a powertrain with a centrifugal pendulum damper according to one embodiment of the present invention.

FIG. 1 is a skeleton diagram showing a configuration of a powertrain with a centrifugal pendulum damper (referred to hereinafter as "the powertrain 10") according to an embodiment of the present invention. As shown in FIG. 1, the powertrain 10 provides an automatic transmission 3 with a transmission mechanism 3a for transmitting a drive force of an engine 1 to a drive wheel 2, a torsion damping mechanism 4 coupling to an output shaft 1a of the engine 1 and an input shaft 3b of transmission mechanism 3a, and a centrifugal pendulum damping mechanism 5 coupled to the input shaft 3b of the transmission mechanism 3a.

The automatic transmission 3 is a multi-stage automatic transmission provided with the transmission mechanism 3a which switches gear ratios in a step-wise manner by selectively engaging one or more of a plurality of friction engaging elements. Note that the automatic transmission 3 may be a continuously variable automatic transmission (CVT) provided with a transmission mechanism which continuously changes gear ratios. Also, a torque converter may be provided instead of the torsion damping mechanism 4.

The torsion damping mechanism 4 provides a first spring member 4a and a second spring member 4b which are disposed in parallel with each other, and between and in series with the aforementioned output shaft 1a and the input shaft 3b. As a result, rotations of the output shaft 1a are transmitted to an input shaft 3b side via the spring members 4a and 4b. Note that the "input shaft 3b" in the present embodiment corresponds to the "power transmission shaft".

The centrifugal pendulum damper mechanism 5 provides a planetary gear set 12 which is a speed increasing mechanism for increasing a rotational speed of the input shaft 3b, a centrifugal pendulum damper 13 which is coupled to the input shaft 3b via the planetary gear set 12, and a clutch mechanism 14 which is a connection/disconnection mechanism which can cut-off or connect the power transmitted from the input shaft 3b to the planetary gear set 12. Note that the clutch mechanism 14 may be disposed between the planetary gear set 12 and the centrifugal pendulum damper 13.

The planetary gear set 12 is a single-pinion type and has, as rotational elements, a sun gear 21, a ring gear 23, and a pinion carrier 24 (hereinafter abbreviated as simply the "carrier 24") supporting a pinion 22 which meshes gears with the sun gear 21 and the ring gear 23.

And the centrifugal pendulum damper 13 is coupled to the sun gear 21 as the input shaft 3b is coupled to the carrier 24 of the planetary gear set 12 via the clutch mechanism 14. Also, the ring gear 23 is restrained from rotating by being coupled to a transmission case 3d.

The centrifugal pendulum damper 13 provides a support member coupled to the sun gear 21 of the planetary gear set 12, and a pendulum which is a mass supported by the support member to be able to swing centered on a circumferential point at a fixed radius from an axial center of the support member. The centrifugal pendulum damper 13 is configured such that when the pendulum swings due to torque fluctuations, a circumferentially-directed component of force is generated in the support member receiving the centrifugal force acting on the pendulum, and torsional vibration of the input shaft 3b can be absorbed as a result of this component of force acting as an anti-torque which suppresses the torque fluctuations of the support member.

The clutch mechanism 14 provides a plurality of friction plates which can be engaged to each other and a hydraulic actuator which engages the friction plates by pressurization, and is configured such that by controlling the hydraulic pressure supplied to the actuator, the engagement degree may be changed, that is, the clutch mechanism 14 may be switched to an engaged, released, or slip state.

Operations of the above-described powertrain 10 will now be explained.

First, when the engine 1 is activated, the engine's power is transmitted to the torsion damping mechanism 4 by which torque fluctuations of the engine 1 are absorbed to some extent. A portion of the power transmitted to the torsion damping mechanism 4 is further transmitted via the input shaft 3b of the transmission mechanism 3a to the centrifugal pendulum damper mechanism 5. When the clutch mechanism 14 of the centrifugal pendulum damper mechanism 5 is engaged, power is transmitted from the input shaft 3b to the planetary gear set 12 via the clutch mechanism 14. In such a case, because the rotation of the ring gear 23 of the planetary gear set 12 is restrained by the transmission case 3d, the sun gear 21 rotates along with the rotation of the carrier 24 which is coupled with the input shaft 3b. The rotation of the sun gear 21 increases in speed, corresponding with the rotation of the carrier 24 according to a gear ratio of the sun gear 21 and the ring gear 23. The centrifugal pendulum damper 13 is driven by the increased rotational speed of the sun gear 21. In this case, the torque fluctuations which were not fully absorbed by the torsion damping mechanism 4 are absorbed by the centrifugal pendulum damper 13.

Further, the powertrain 10 in the present embodiment is provided with each of an engine rotational speed sensor 101 for detecting a rotational speed of the output shaft 1a of the engine 1, a transmission mechanism input shaft rotational speed sensor 102, (hereinafter referred to simply as "the input shaft rotational speed sensor 102") for detecting the rotational speed of the input shaft 3b of the transmission mechanism 3a, a vehicle speed sensor 103 for detecting a rotational speed of an output shaft 3c of the transmission mechanism 3a, and a pendulum rotational speed sensor 104 for detecting a rotational speed of the centrifugal pendulum damper 13. Magnetic sensors such as, for example, pickup coil types, hole element types, magneto-resistive element types, or the like, may be used as the rotational speed sensors 101 to 104. Note that the pendulum rotational speed sensor 104 in the present embodiment is one which indirectly detects the rotational speed of the centrifugal pendulum damper 13 based upon a rotational speed obtained by detecting a rotational speed of a rotational element on a planetary gear set 12 side of the clutch mechanism 14 which is coupled via the centrifugal pendulum damper 13 and the planetary gear set 12, with consideration given to a speed increase due to the planetary gear set 12. However, the pendulum rotational speed sensor may alternatively be a sensor which directly detects the rotational speed of the centrifugal pendulum damper. It is also possible to remove one of the engine rotational speed sensor 101 and the input shaft rotational speed sensor 102 since the engine rotational speed and transmission mechanism input rotational speed are substantially the same.

Furthermore, the powertrain 10 configured according to the above description is provided with a control unit 100 (not shown in FIG. 1) which comprehensively controls structures related to the powertrain 10 such as the engine 1, the automatic transmission 3, and the clutch mechanism 14 of the centrifugal pendulum damper mechanism 5. The control unit 100 is configured with a microprocessor as a main part.

Next, a control system of the powertrain comprised of the control unit 100 is described with reference to FIG. 2.

Figure 2:
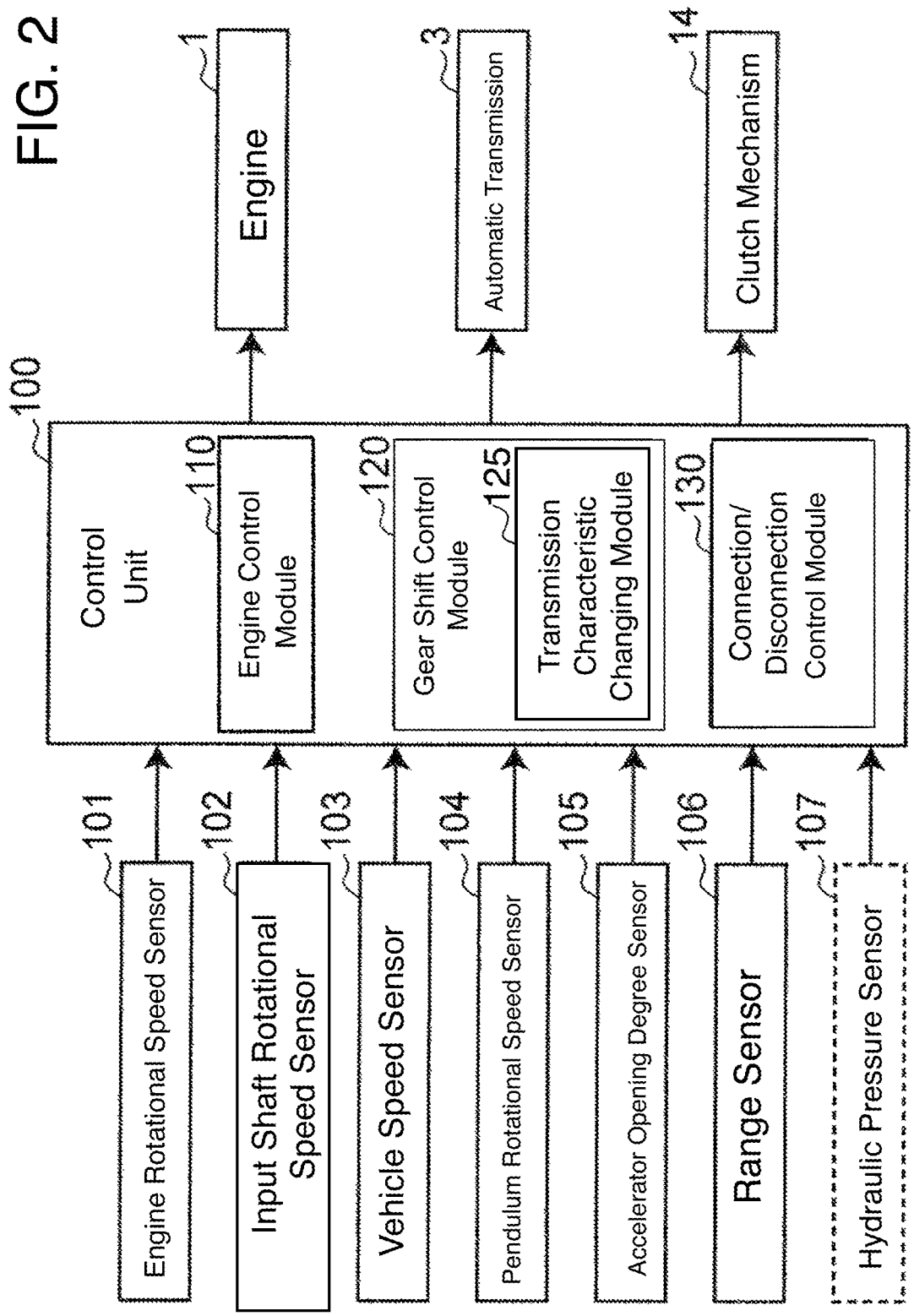
FIG. 2 is a diagram illustrating a control system of the powertrain.

FIG. 2 is a diagram of a control system of the powertrain 10. As shown in FIG. 2, the control unit 100 is configured such that signals from the engine rotational speed sensor 101, the input shaft rotational speed sensor 102, the vehicle speed sensor 103, the pendulum rotational speed sensor 104, an accelerator opening degree sensor 105 for detecting an accelerator opening degree which indicates a load of the engine 1, a range sensor 106 which detects an operation position of a shift lever, or the like, are input thereto. A hydraulic pressure sensor 107 for detecting a control hydraulic pressure supplied to the clutch mechanism 14 may be provided as an alternative to, or in addition to, the pendulum rotational sensor 104.

Further, the control unit 100 is provided with an engine control module 110 which outputs control signals to the engine 1 based on input signals from the various above-described sensors or the like, a gear shift control module 120 which outputs a control signal to the automatic transmission 3 to change a gear ratio based on a gear shift command, and a connection/disconnection control module 130 which outputs a control signal for controlling the engagement degree of the clutch mechanism based on a connection or disconnection command. The gear shift control module 120 is provided with a transmission characteristic changing module 125 for changing a control characteristic of transmission hydraulic pressure supplied to the transmission mechanism 3a based on an engagement degree of the clutch mechanism 14 during a gear shift control. It will be understood that modules provided in the control unit 100 are software or firmware stored in non-volatile memory of the control unit 100 and configured to be executed by one or more processors of the control unit. Further, certain functional aspects of the modules may be implemented in hardware as application specific integrated circuit (ASIC), for example.

The engine control module 110 can perform a fuel injection control and an ignition control of the engine 1. The engine control module 110 may also perform a cylinder number control or the like.

The gear shift control module 120 performs a gear shift control of shifting the gear range (gear ratio) based on input signals from the vehicle speed sensor 103, the accelerator opening degree sensor 105, the range sensor 106, and the like. That is, the gear shift control module 120 outputs a gear shift command to shift to a desired gear range determined from the current vehicle speed and accelerator opening degree according to a gear shift map, which is not shown, and performs a control of shifting the transmission mechanism 3a to the desired gear range based on the gear shift command.

The transmission characteristic changing module 125 determines an engagement degree of the clutch mechanism 14 based on input signals from the input shaft rotational speed sensor 102 and the pendulum rotational speed sensor 104, and changes control characteristics of hydraulic pressure supplied to friction engaging elements of an engaged side and a released side based on a moment of inertia of the input shaft 3b corresponding to the determined engagement degree.

In the present embodiment, the engagement degree of the clutch mechanism 14 is determined by a differential rotation $\Delta N$ ($=N_1-N_2$) of the clutch mechanism 14 which is obtained from a rotational speed $N_1$ of the input shaft 3b detected by the input shaft rotational speed sensor 102, and a rotational speed $N_2$ of the centrifugal pendulum damper 13 (before a speed increase) detected by the pendulum rotational speed sensor 104. A moment of inertia of the centrifugal pendulum damper 13 which is added to the input shaft 3b according to the engagement degree can be calculated from the following equation (1), wherein $J_A$ is a single moment of inertia of the centrifugal pendulum damper 13.

$$J_A \times \left(1 - \frac{\Delta N}{N_1}\right)^2 \qquad \text{(No. 1)}$$

As is apparent from the above equation (1), in a state where the clutch mechanism 14 is completely engaged, the differential rotation $\Delta N$ is zero, and the moment of inertia added to the input shaft 3b is a maximum value ($J_A$). And, when the clutch mechanism is in a slip state, the differential rotation $\Delta N$ is a fixed value greater than zero and lesser than $N_1$, and the moment(s) of inertia added to the input shaft 3b becomes a fixed value lesser than $J_A$. Furthermore, in a state in which the clutch mechanism 14 is completely released while the rotation of the centrifugal pendulum damper 13 is stopped ($N_2=0$), the differential rotation $\Delta N$ is $N_1$, and the moment of inertia added to the input shaft 3b is a minimum value (zero).

Note that the engagement degree of the clutch mechanism 14 may be determined based on the control hydraulic pressure of the clutch mechanism 14 detected by the hydraulic pressure sensor 107.

Figure 3:
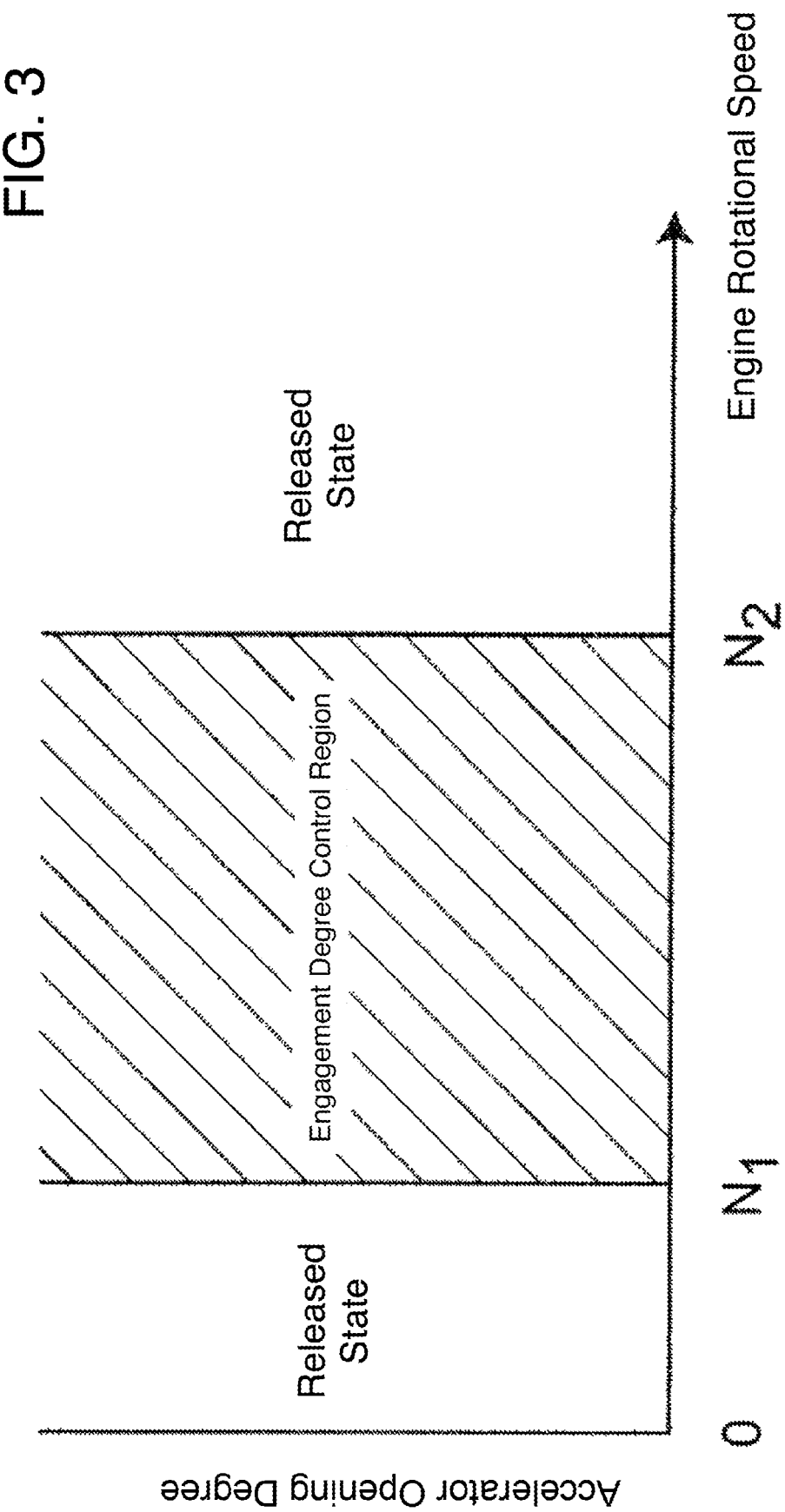
FIG. 3 illustrates a connection/disconnection control map for a clutch mechanism of the powertrain.

The connection/disconnection control module 130 outputs a connection/disconnection command and performs a connection/disconnection control of changing the engagement degree of the clutch mechanism 14 according to the control map shown in FIG. 3, which is based on input signals from the engine rotational speed sensor 101 and the accelerator opening degree sensor 105.

That is, the connection/disconnection control module 130 performs a control on the engagement degree of the clutch mechanism 14 such that the clutch mechanism 14 is in a released state when the engine rotational speed is within a low-speed range of $N_1$ or less or in a high-speed range above $N_2$ ($N_2>N_1$), and in the engaged state or the slip state, which has a desired engagement degree, when an engine rotational speed is within an engagement degree control region of between $N_1$ and $N_2$.

Further, when the engine rotational speed reaches the rotational speed $N_1$ while increasing from a low-speed range to the engagement degree control region or reaches the rotational speed $N_2$ while decreasing from a high-speed range to the engagement degree control region, the connection/disconnection control module 130 makes a determination to switch the clutch mechanism 14 from the released state to the slip state which has the desired degree of engagement or the engaged state, and, based on this determination, performs a control of changing the degree of engagement to switch the clutch mechanism 14 to the slip state or the engaged state.

Furthermore, when the engine rotational speed reaches the rotational speed $N_1$ while decreasing from the engagement degree control region to a low-speed range or reaches the rotational speed $N_2$ while increasing from the engagement degree control region to a high-speed range, the connection/disconnection control module 130 outputs to the control unit 100 a connection/disconnection command for switching the clutch mechanism 14 from the engaged state or the slip state to the released state as an internal command, and based on this connection/disconnection command, the clutch mechanism 14 performs a control of changing an engagement degree to switch to the released state.

In this case, a rotational speed which is higher than an idling rotational speed is set as the engine rotational speed $N_1$. Further, a rotational speed of the centrifugal pendulum damper 13, which was increased by the planetary gear set 12 to a remarkably high-speed rotation such that there is a concern the reliability of the centrifugal pendulum damper 13 being influenced, is set as the engine rotational speed $N_2$.

According to the above-described connection/disconnection controls, when the engine rotational speed is in the engagement degree control region, the clutch mechanism 14 is in the slip state or the engaged state, and the centrifugal pendulum damper 13 rotates together with the input shaft 3b, and, therefore, the torsional vibration of the input shaft 3b is absorbed by the centrifugal pendulum damper 13.

Figure 4:
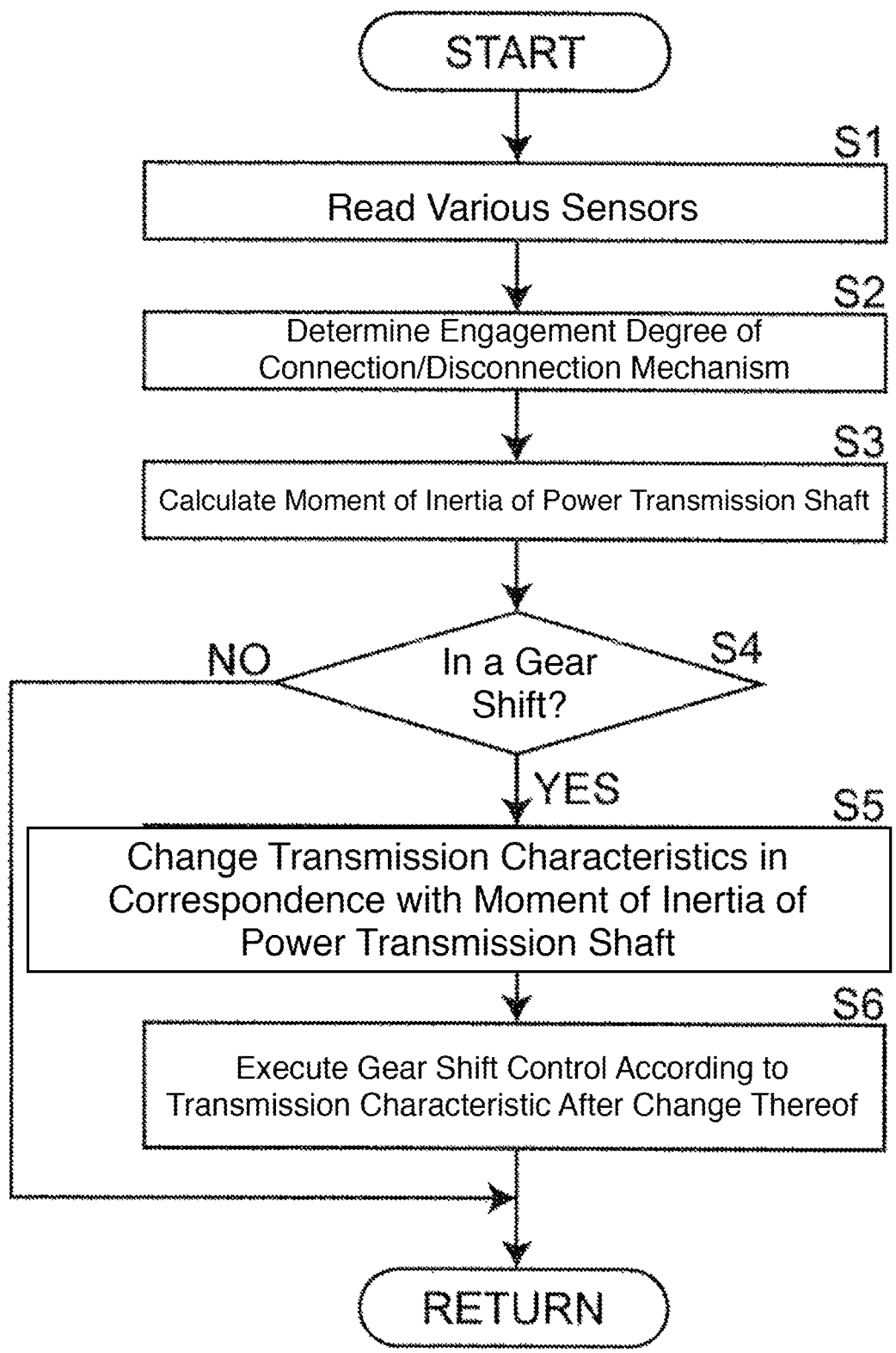
FIG. 4 illustrates a flowchart of a method of controlling the powertrain.

The powertrain 10 is controlled by the control unit 100 and, for example, is controlled according to the flowchart shown in FIG. 4.

First, as shown in FIG. 4, signals output from various sensors are read in S1. Then, in S2, a differential rotation of the clutch mechanism 14 is detected based on output signals from the input shaft rotational speed sensor 102 and the pendulum rotational speed sensor 104, and an engagement degree of the clutch mechanism 14 is determined based on the detected differential rotation.

After the engagement degree of the clutch mechanism 14 is determined in S2, the moment of inertia of the input shaft 3b is calculated based on the engagement degree determined in S2.

After the moment of inertia of the input shaft 3b is calculated in S3, next, in S4, a determination is made of whether a gear shift is taking place or not.

If it is determined in S4 that a gear shift is not taking place, then the flow returns to S1. If it is determined in S4 that a gear shift is taking place, then, next, in S5, the transmission characteristic changing module 125 changes control characteristics of transmission hydraulic pressures of friction engaging elements which are fastened (hereinafter referred to as "fastening elements"), and friction engaging elements which are released (hereinafter referred to as "releasing elements") of the transmission mechanism 3a according to a moment of inertia of the input shaft 3b.

After the control characteristics of the transmission hydraulic pressures are changed in S5, then, next, in S6, the gear shift control module 120 executes a gear shift control by supplying the transmission hydraulic pressures with the changed control characteristics to the transmission mechanism 3a.

Specific operations of the powertrain 10 in this case will be described with reference to the time charts in FIG. 5 and FIG. 6.

Figure 5:
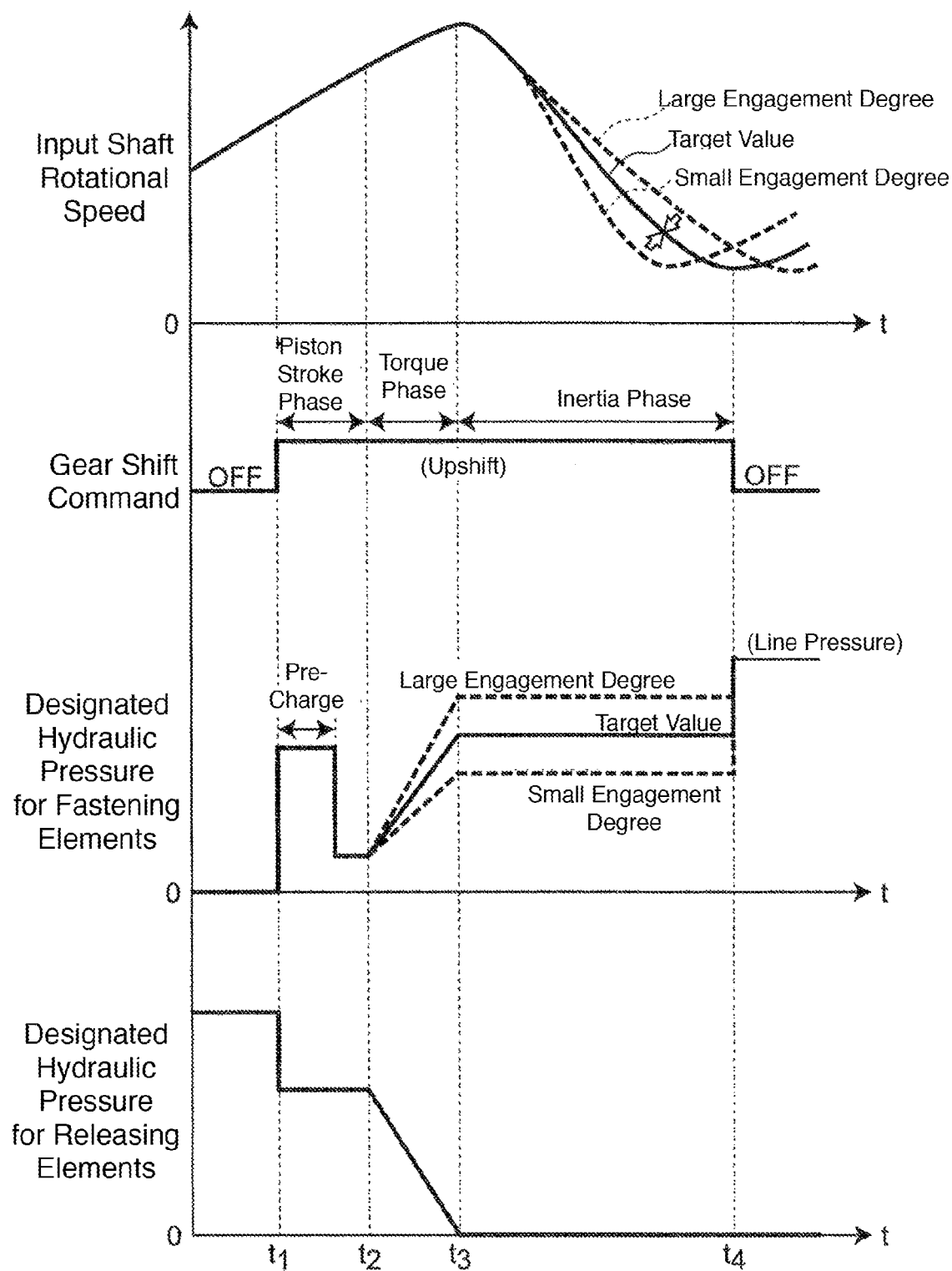
FIG. 5 shows time charts of specific operations to illustrate control characteristic changes of transmission hydraulic pressure according to the flowchart in FIG. 4 during an upshift.

FIG. 5 shows time charts illustrating changes in control characteristics of transmission hydraulic pressures in a case where, when the transmission mechanism 3a upshifts during acceleration, an engagement degree of the clutch mechanism 14 remains constant throughout the gear shift control duration. As shown in FIG. 5, at a time 0, the clutch mechanism 14 has the desired engagement degree and is in the slip state or the engaged state and the transmission mechanism 3a is not in the midst of a gear shift control, and when the gear shift control module 120 outputs a gear shift command for upshifting the transmission mechanism 3a at a time t1 while the input shaft rotational speed of the transmission mechanism 3 is increasing, an execution of a gear shift control of the transmission mechanism 3a is started based on the gear shift command, wherein first, a piston stroke phase is started. At this time, an operational hydraulic pressure retaining a relatively low pressure after a pre-charge, in which the hydraulic pressure was temporarily raised, is supplied to fastening elements, among the plurality of friction engaging elements provided to the transmission mechanism 3a. On the other hand, in order to realize a desired gear range, an operational hydraulic pressure of releasing elements is decreased to a predetermined hydraulic pressure in a step-wise manner.

Next, at a time t2, the piston stroke phase is finished and a torque phase is started, and the operational hydraulic pressure of the fastening elements gradually increases to a predetermined target hydraulic pressure while, on the other hand, the operational hydraulic pressure of the releasing elements gradually decreases to zero.

Next, at a time t3, when the torque phase is finished and an inertia phase is started, the operational hydraulic pressure of the fastening elements is maintained at the target pressure value, while, on the other hand, the operational hydraulic pressure of the releasing elements is maintained at zero. The target value of the operational hydraulic pressure of the fastening elements is set to be an optimal target value for the input shaft rotational speed in the inertia phase when the clutch mechanism 14 has the desired engagement degree.

Next, at a time t4, when the inertia phase is finished, the operational hydraulic pressure of the fastening elements is increased to a line pressure in a step-wise manner, and the gear shift control of switching the transmission mechanism 3a to a desired gear range is finished.

In this case, when an actual engagement degree of the clutch mechanism 14 changes to an engagement degree which is different from the desired engagement degree before an upshift is started and the changed engagement degree is maintained throughout a gear change control duration, the transmission hydraulic pressure supplied to the fastening elements of the transmission mechanism 3a between the times t2 and t4 is changed from the target value according to the actual engagement degree of the clutch mechanism 14.

For example, there is a possibility that a gear shift duration may be lengthened when an actual engagement degree of the clutch mechanism 14 is greater than the desired engagement degree due to an increase in a moment of inertia of the input shaft 3b, as shown by a dashed line in the time chart of the input shaft rotational speed in FIG. 5. Therefore, in the present embodiment, between the times t2 and t4, the transmission hydraulic pressure of the fastening elements of the transmission mechanism 3a is changed to a hydraulic pressure which is higher than the target value as shown by a dashed line in the time chart of the designated hydraulic pressure for the fastening elements in FIG. 5. The changed transmission pressure is set to be an optimal hydraulic pressure based on the moment of inertia of the input shaft 3b such that the input shaft rotational speed in the inertia phase becomes the above-described optimal target value.

Further, there is a possibility that a transmission shock will be generated when the gear shift duration becomes rapidly shorter when an actual engagement degree of the clutch mechanism 14 is smaller than the desired engagement degree because the moment of inertia of the input shaft 3b becomes smaller as shown by a dashed line in the time chart of the input shaft rotational speed in FIG. 5. Therefore, in the present embodiment, between the times t2 and t4, the transmission hydraulic pressure of the engagement elements of the transmission mechanism 3a is changed to a hydraulic pressure which is lower than the target value as shown by a dashed line in the time chart of the designated hydraulic pressure for the fastening elements in FIG. 5. This changed transmission hydraulic pressure is similarly set to be an optimal hydraulic pressure based on the moment of inertia of the input shaft 3b such that the input shaft rotational speed in the inertia phase becomes the above-described optimal target value.

Therefore, by the changing control characteristics of the transmission hydraulic pressure when upshifting, lengthening of the gear shift duration and deterioration of transmission performance due to a change in the engagement degree of the clutch mechanism 14 can be prevented.

Note that even when an engagement degree of the clutch mechanism 14 changes during a gear shift control, both of a gear shift control and a control requiring a change of the engagement degree of the clutch mechanism 14 (for example, a cylinder cut-off operation) may be executed properly, even if the controls overlap, by changing control characteristics of transmission hydraulic pressure according to the changed engagement degree.

Figure 6:
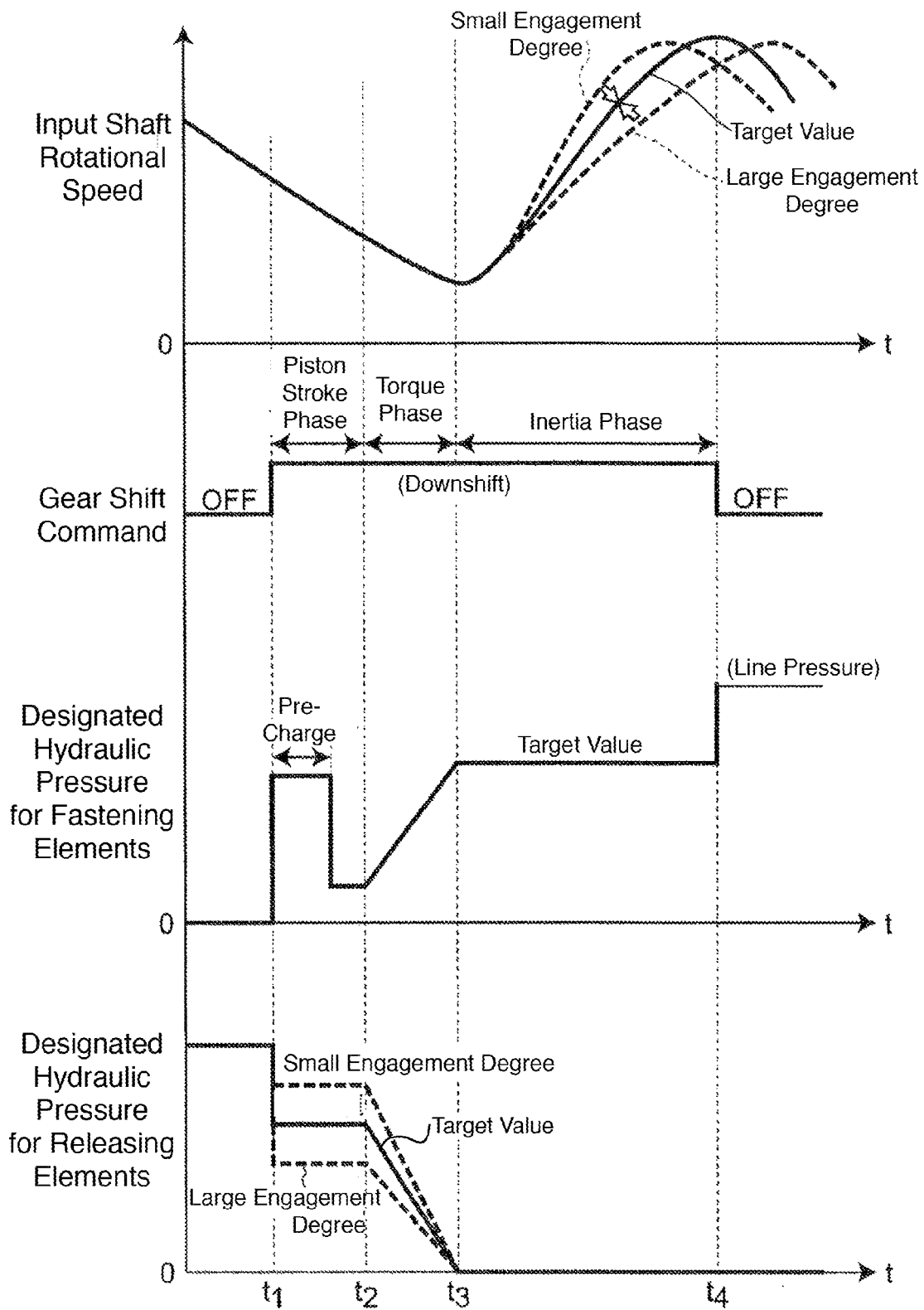
FIG. 6 shows time charts of specific operations to illustrate control characteristic changes of transmission hydraulic pressure according to the flowchart in FIG. 4 during a downshift.

FIG. 6 shows time charts illustrating changes in control characteristics of transmission hydraulic pressure in a case where the transmission mechanism 3a downshifts during deceleration and an engagement degree of the clutch mechanism 14 remains constant throughout the gear shift control duration. As shown in FIG. 6, at a time 0, the clutch mechanism 14 has the desired engagement degree and is in the slip state or the engaged state, and the transmission mechanism 3a is not in the midst of a gear shift control, and when the gear shift control module 120 outputs a gear shift command for downshifting the transmission mechanism 3a at a time t1 while the input shaft rotational speed of the transmission mechanism 3 is decreasing, the transmission hydraulic pressures supplied to the fastening elements and the releasing elements are controlled in the same manner as in the upshift until the gear shift control is completed at a time t4.

In this case, when an actual engagement degree of the clutch mechanism 14 changes to an engagement degree which is different from the desired engagement degree before a downshift is started and the changed engagement degree is maintained throughout a gear change control duration, the transmission hydraulic pressure supplied to the releasing elements of the transmission mechanism 3a between times t1 and t3 is changed from the target value to correspond to the actual engagement degree of the clutch mechanism 14.

For example, because a moment of inertia of the input shaft 3b is increased when an actual engagement degree of the clutch mechanism 14 is greater than the desired engagement degree, there is a possibility of a gear shift duration being lengthened in such a case, as shown by a dashed line in the time chart of the input shaft rotational speed in FIG. 6. Therefore, in the present embodiment, the transmission hydraulic pressure of the releasing elements of the transmission mechanism 3a is changed to a hydraulic pressure which is lower than a target value between the times t1 and t3, as shown by a dashed line in the time chart of the designated hydraulic pressure for the releasing elements in FIG. 6. The changed transmission pressure is set to be an optimal hydraulic pressure based on the moment of inertia of the input shaft 3b such that the input shaft rotational speed in the inertia phase becomes the above-described optimal target value.

Further, because the moment of inertia of the input shaft 3b becomes smaller when an actual engagement degree of the clutch mechanism 14 is smaller than the desired engagement degree, there is a possibility that a transmission shock will be generated if a gear shift duration is drastically shortened in such a case, as shown by a dashed line in the time chart of the input shaft rotational speed in FIG. 6.

Therefore, in the present embodiment, the transmission hydraulic pressure of the releasing elements of the transmission mechanism 3a is changed to a hydraulic pressure which is lower than a target value between the times t1 and t3, as shown by a dashed line in the time chart of the designated hydraulic pressure for the releasing elements in FIG. 6. The changed transmission hydraulic pressure is similarly set to be an optimal hydraulic pressure based on the moment of inertia of the input shaft 3b such that the input shaft rotational speed is at the optimal target value during the inertia phase.

Consequently, lengthening of the gear shift duration and deterioration of transmission performance due to a change in the engagement degree of the clutch mechanism 14 may be prevented by changing the control characteristics of the transmission hydraulic pressure when downshifting.

Note that as an alternative or additional method for changing control characteristics of the transmission hydraulic pressure during downshifting, in a case where an actual engagement degree of the clutch mechanism 14 is greater than the desired engagement degree, the transmission hydraulic pressure of the fastening elements may be changed to be lower than the target value between the times t1 and t3. Conversely, in a case where an actual engagement degree is smaller than the desired engagement degree, the transmission hydraulic pressure of the fastening elements may be changed to be higher than the target value during the same time period.

Further, even in a case where the transmission mechanism 3a is downshifted to accelerate the vehicle, lengthening of the gear shift duration and deterioration of transmission performance due to a change in the engagement degree of the clutch mechanism 14 can be prevented by changing control characteristics of the transmission hydraulic pressure in the same manner as in a downshift during deceleration.

Next, specific operations of the powertrain 10 according to the modified embodiment will be described with reference to the time charts in FIG. 7.

Figure 7:
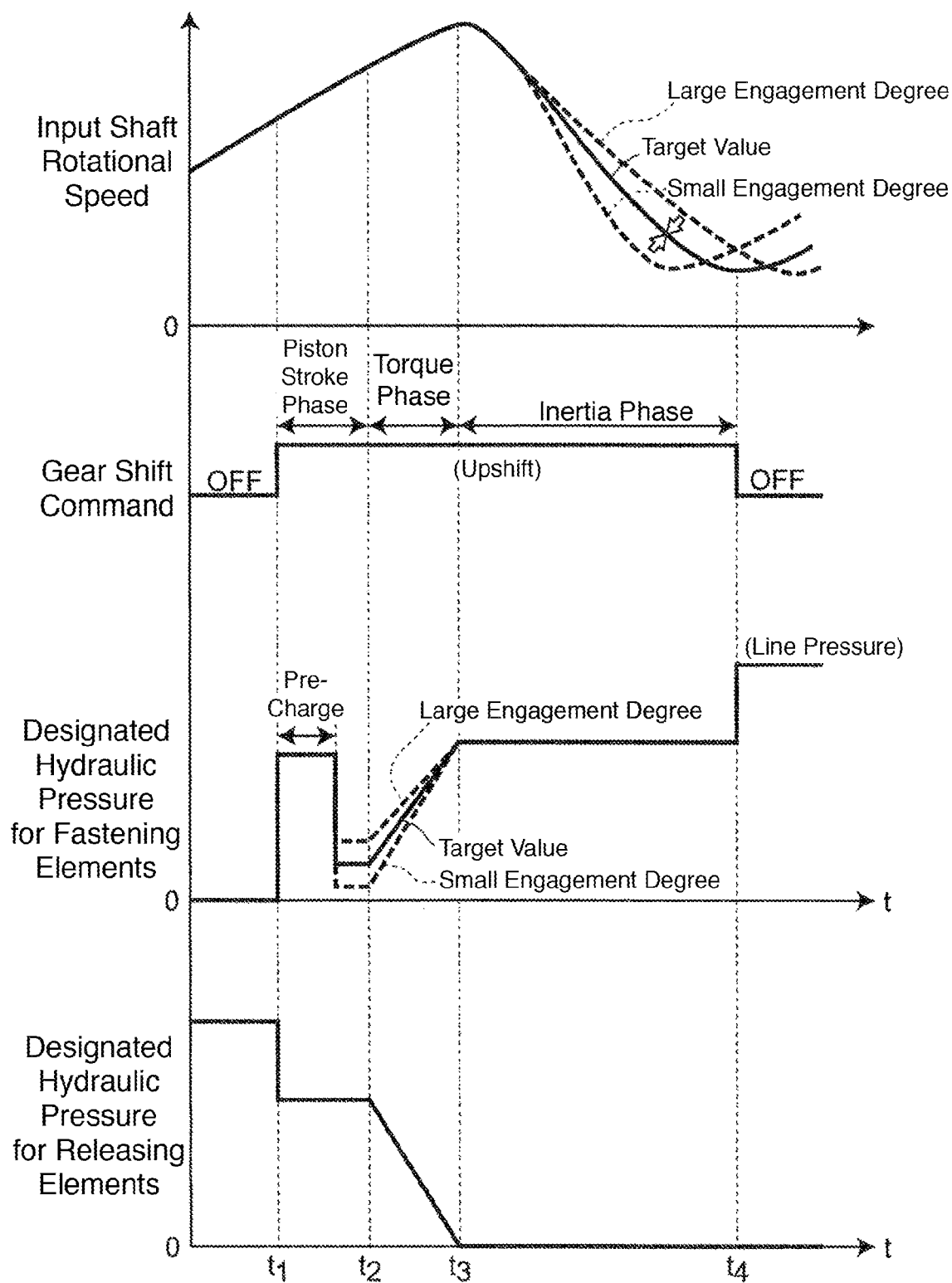
FIG. 7 shows time charts of specific operations to illustrate control characteristic changes of transmission hydraulic pressure according to the flowchart in FIG. 4 during an upshift according to a modified embodiment.

FIG. 7 shows time charts illustrating control characteristics changes of transmission hydraulic pressure according to a modified embodiment in a case where, as in FIG. 5, an engagement degree of the clutch mechanism 14 remains constant through the gear shift control duration when the transmission mechanism 3a upshifts during acceleration. As illustrated in FIG. 7, in a case where the clutch mechanism 14 has the desired engagement degree, the transmission hydraulic pressure supplied to the fastening elements and releasing elements of the transmission mechanism 3a are controlled in the same manner as in FIG. 5.

In this case, when an actual engagement degree of the clutch mechanism 14 changes to an engagement degree which is different from the desired engagement degree before an upshift is started and the changed engagement degree is maintained throughout a gear change control duration, the transmission hydraulic pressure supplied to the fastening elements of the transmission mechanism 3a is changed from the target value to correspond to the actual engagement degree of the clutch mechanism 14.

For example, in the modified embodiment, when an actual engagement degree of the clutch mechanism 14 is greater than the desired engagement degree, transmission hydraulic pressure of the fastening elements is changed to a hydraulic pressure which is higher than the target value between a time at which the pre-charge is finished and a time t3, as shown by a dashed line in the time chart of the designated hydraulic pressure for the fastening elements in FIG. 7. The changed transmission hydraulic pressure is set to be an optimal hydraulic pressure based on a moment of inertia of the input shaft 3*b* such that an input shaft rotational speed in the inertia phase becomes an optimal target value as described above.

Further, with the modified embodiment, when an actual engagement degree of the clutch mechanism 14 is smaller than the desired engagement degree, transmission hydraulic pressure of the fastening elements is changed to be a hydraulic pressure lower than the target pressure between a time at which the pre-charge is finished and the time t3, as shown by a dashed line in the time chart of the designated hydraulic pressure for the fastening elements in FIG. 7.

Consequently, lengthening of the gear shift duration due to a change in the engagement degree of the clutch mechanism 14 and deterioration of transmission performance due to transmission shock when upshifting can be prevented by changing the control characteristics of the transmission hydraulic pressure as described above.

According to the above configuration, when the engagement degree of the clutch mechanism 14 changes, the moment of inertia of the input shaft 3*b* changes according to the engagement degree, and according to the present embodiment, the transmission characteristic changing module 125 changes the control characteristics of the transmission hydraulic pressure supplied to the transmission mechanism 3*a* according to the engagement degree of the clutch mechanism 14, and therefore, lengthening of the gear shift duration due to the moment of inertia being increased and generation of transmission shock may be prevented, and degradation of transmission performance due to a change in the engagement degree of the connection/disconnection mechanism can be prevented.

Further, lengthening of the gear shift duration can be suppressed by, for example, increasing the transmission hydraulic pressure of the fastening elements of the transmission mechanism 3*a* during upshifting of the transmission mechanism 3*a*, because, according to the present embodiment, the higher the engagement degree of the clutch mechanism 14 is, the higher the transmission characteristic changing module 125 increases the transmission hydraulic pressure.

Further, according to the present embodiment, because the transmission characteristic changing module 125 changes the control characteristics of the transmission hydraulic pressure according to the moment of inertia of the input shaft 3*b* which changes according to the engagement degree of the clutch mechanism 14, even when the engagement degree is changed during a gear shift control, a gear change control may be performed with a higher degree of accuracy by changing the transmission hydraulic pressure according to changes in the moment of inertia which directly influences transmission performance. And therefore, lengthening of the gear shift duration and generation of transmission shock can be more strictly controlled and deterioration of transmission performance can be more surely prevented.

Further, according to the present embodiment, the transmission characteristic changing module 125 changes according to changes in an engagement degree of the clutch mechanism 14 during a gear shift control of a step-up process, the transmission hydraulic pressure is changed from the torque phase before the start of the inertia phase, and from the beginning of the start of the inertia phase, which is directly influenced by the engagement degree, the transmission hydraulic pressure is changed to a hydraulic pressure which corresponds to the engagement degree. Therefore, since a delay does not occur in the changing of the transmission hydraulic pressure, lengthening of the gear shift duration and generation of transmission shock can be more surely prevented.

Further, according to the present embodiment, the transmission characteristic changing module 125 determines the engagement degree of the clutch mechanism 14 based on the differential rotation of the clutch mechanism 14, and the benefits of the above-described embodiment can be realized with a simple configuration equipped with only the rotational speed sensor 104 for detecting the rotational differential of the clutch mechanism 14.

The present invention is not limited by the illustrated embodiments, and various enhancements and design modifications may be made within a range that does not deviate from the scope of the present invention.

For example, although the present embodiment describes an example of using the frictionally-engaged type clutch mechanism 14 operated by hydraulic pressure as the connection/disconnection mechanism, the connection/disconnection mechanism is not limited to such. For example, a solenoid-operated electromagnetic friction clutch may alternatively be used.

Further, although the present embodiment describes an example of using the clutch mechanism 14 as the connection/disconnection mechanism, the connection/disconnection mechanism is not limited to such. For example, a break mechanism may be alternatively disposed between the ring gear 23 of the planetary gear set 12 and the transmission case 3*d* as the connection/disconnection mechanism.

Furthermore, although the present embodiment describes an example of using the engine 1, an internal combustion engine, as the power source, the power source is not limited to such. For example, a so-called hybrid engine may alternatively be used wherein the hybrid engine is configured such that a power generator is attached to the engine and is used as a motor to assist the engine during acceleration while also generating power.

As described above, a reduction in the reliability of the centrifugal pendulum damper due to high speed rotation of the damper can be avoided according to the present invention which may therefore be suitably used in a manufacturing technology field of control devices of powertrains with this type of centrifugal pendulum damper or of vehicles mounted therewith.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

3*a* Transmission Mechanism
3*b* Input shaft (power transmission shaft)
10 Powertrain
13 Centrifugal pendulum damper
14 Clutch mechanism (connection/disconnection mechanism)
100 Control unit (control device)
120 Gear shift control module
125 Transmission characteristic changing module
130 Connection/disconnection control module

The invention claimed is:
1. A control device for a powertrain, the powertrain comprising a power transmission shaft configured to trans- mit power between a drive source and an automatic transmission, and a centrifugal pendulum damper configured to be operatively coupled to the power transmission shaft and a connection/disconnection mechanism, the control device comprising:

a transmission control module, wherein the automatic transmission is configured with a transmission mechanism of a hydraulic pressure control type;

the transmission control module is operatively coupled to the transmission mechanism and configured to perform a control to supply transmission hydraulic pressure to the transmission mechanism; and the transmission control module includes a transmission characteristic changing module which changes a control characteristic of the transmission hydraulic pressure according to an engagement degree of the connection/disconnection mechanism.

2. The control device of claim 1, wherein the transmission characteristic changing module increases the transmission hydraulic pressure with an increase in the engagement degree of the connection/disconnection mechanism.

3. The control device of claim 2, wherein the transmission characteristic changing module changes the control characteristic of the transmission hydraulic pressure according to a moment of inertia of the power transmission shaft, the moment of inertia being based on the engagement degree of the connection/disconnection mechanism.

4. The control device of claim 3, wherein when the engagement degree is changed during a gear shift control, the transmission characteristic changing module changes the control characteristic of the transmission hydraulic pressure according to the engagement degree after the gear shift control.

5. The control device of claim 4, wherein the transmission characteristic changing module changes the transmission hydraulic pressure in a step-up process during the gear shift control according to the engagement degree of the connection/disconnection mechanism.

6. The control device of claim 5, wherein the transmission characteristic changing module determines the engagement degree of the connection/disconnection mechanism based on one of a rotational differential of the connection/disconnection mechanism and a control hydraulic pressure of the connection/disconnection mechanism.

7. The control device of claim 2, wherein when the engagement degree is changed during a gear shift control, the transmission characteristic changing module changes the control characteristic of the transmission hydraulic pressure according to the engagement degree after the gear shift control.

8. The control device of claim 2, wherein the transmission characteristic changing module changes the transmission hydraulic pressure in a step-up process during the gear shift control according to the engagement degree of the connection/disconnection mechanism.

9. The control device of claim 2, wherein the transmission characteristic changing module determines the engagement degree of the connection/disconnection mechanism based on one of a rotational differential of the connection/disconnection mechanism and a control hydraulic pressure of the connection/disconnection mechanism.

10. The control device of claim 3, wherein the transmission characteristic changing module changes the transmission hydraulic pressure in a step-up process during the gear shift control according to the engagement degree of the connection/disconnection mechanism.

11. The control device of claim 1, wherein the transmission characteristic changing module changes the control characteristic of the transmission hydraulic pressure according to a moment of inertia of the power transmission shaft, the moment of inertia being based on the engagement degree of the connection/disconnection mechanism.

12. The control device of claim 11, wherein when the engagement degree is changed during a gear shift control, the transmission characteristic changing module changes the control characteristic of the transmission hydraulic pressure according to the engagement degree after the gear shift control.

13. The control device of claim 12, wherein the transmission characteristic changing module changes the transmission hydraulic pressure in a step-up process during the gear shift control according to the engagement degree of the connection/disconnection mechanism.

14. The control device of claim 13, wherein the transmission characteristic changing module determines the engagement degree of the connection/disconnection mechanism based on one of a rotational differential of the connection/disconnection mechanism and a control hydraulic pressure of the connection/disconnection mechanism.

15. The control device of claim 1, wherein when the engagement degree is changed during a gear shift control, the transmission characteristic changing module changes the control characteristic of the transmission hydraulic pressure according to the engagement degree after the gear shift control.

16. The control device of claim 15, wherein the transmission characteristic changing module changes the transmission hydraulic pressure in a step-up process during the gear shift control according to the engagement degree of the connection/disconnection mechanism.

17. The control device of claim 16, wherein the transmission characteristic changing module determines the engagement degree of the connection/disconnection mechanism based on one of a rotational differential of the connection/disconnection mechanism and a control hydraulic pressure of the connection/disconnection mechanism.

18. The control device of claim 1, wherein the transmission characteristic changing module changes the transmission hydraulic pressure in a step-up process during the gear shift control according to the engagement degree of the connection/disconnection mechanism.

19. The control device of claim 18, wherein the transmission characteristic changing module determines the engagement degree of the connection/disconnection mechanism based on one of a rotational differential of the connection/disconnection mechanism and a control hydraulic pressure of the connection/disconnection mechanism.

20. The control device of claim 1, wherein the transmission characteristic changing module determines the engagement degree of the connection/disconnection mechanism based on one of a rotational differential of the connection/disconnection mechanism and a control hydraulic pressure of the connection/disconnection mechanism.

* * * * *